US006120300A

United States Patent [19]
Ho et al.

[11] Patent Number: 6,120,300
[45] Date of Patent: *Sep. 19, 2000

[54] REWARD ENRICHED LEARNING SYSTEM AND METHOD II

[76] Inventors: Chi Fai Ho, 4816 Cabello Ct., Union City, Calif. 94587; Peter P. Tong, 1807 Limetree La., Mountain View, Calif. 94040

[*] Notice: This patent is subject to a terminal disclaimer.

[21] Appl. No.: 08/968,311

[22] Filed: Nov. 12, 1997

Related U.S. Application Data

[63] Continuation-in-part of application No. 08/633,582, Apr. 17, 1996, Pat. No. 5,743,746.

[51] Int. Cl.$^7$ .................................................. G09B 3/00
[52] U.S. Cl. ......................... 434/332; 434/362; 434/322; 434/118
[58] Field of Search .................................. 434/332, 362, 434/118, 322

[56] References Cited

U.S. PATENT DOCUMENTS

| | | | |
|---|---|---|---|
| 4,611,996 | 9/1986 | Stoner .................................... | 434/202 |
| 4,926,255 | 5/1990 | Von Kohorn .......................... | 434/323 |
| 5,004,966 | 4/1991 | Eakin ..................................... | 318/446 |
| 5,035,625 | 7/1991 | Monson et al. ........................ | 434/332 |
| 5,173,051 | 12/1992 | May et al. .............................. | 434/118 |
| 5,286,036 | 2/1994 | Barabash ................................ | 273/429 |
| 5,411,271 | 5/1995 | Mirando ................................. | 273/434 |
| 5,494,444 | 2/1996 | Thayer et al. .......................... | 434/362 |
| 5,597,312 | 1/1997 | Bloom et al. .......................... | 434/362 |
| 5,616,033 | 4/1997 | Kewrwin ................................ | 434/118 |
| 5,681,170 | 10/1997 | Rieber et al. .......................... | 434/355 |
| 5,743,746 | 4/1998 | Ho et al. ................................ | 434/332 |
| 5,779,486 | 7/1998 | Ho et al. ................................ | 434/353 |

OTHER PUBLICATIONS

Success Maker Courseware, published by Computer Curriculum Corporation, No date.
Active Mind Series from World Wide Web, URL=http://www.broderbund.com/studio/ams.html, No date.
Logical Journal of the Zoombinis from World Wide Web, URL=http://www.broderbund.com/studio/atoz/zoombini.html, No date.
Selecting Software by PC Novice Series, vol. 3, Issue 12, pp. 51 and 64, No date.
Computerized Adaptive Testing, Oct. 24, 1994, from World Wide Web, URL=Gopher://Gopher.ETS.org.
Innovation and Technologies, Oct. 21, 1994, from World Wide Web, URL=Gopher://Gopher.ETS.org.
Interactive Mathematic Instructor's Guide by Academic Systems, pp. 86 and 114, No date.
High School Learning and Resource Library by ProOne, photocopy of the box and screen–dump to get 5 pages, No date.
Guide to Selecting Software by PC Novice, vol. 3, Issue 12, pp. 89–92, No date.

*Primary Examiner*—Valencia Martin-Wallace
*Assistant Examiner*—David A. Fleming
*Attorney, Agent, or Firm*—Peter Tong

[57] ABSTRACT

A computer-aided-educational system and method for rewarding a student when the student attains a milestone in a subject. The subject is divided into line-items with at least one line-item being more difficult than another line-item. In one embodiment, the system includes a milestone setter, a performance analyzer, a reward determinator and a reward generator. The milestone setter sets a number of milestones, with each milestone being related to a line-item, and with an instructor providing inputs to the milestone setter to set each line-item that has a milestone to be reached. In one embodiment, at least one such line-item reflects the student's understanding in the subject. The performance analyzer coupled to the milestone setter determines whether the student has reached a milestone. The reward determinator coupled to the performance analyzer determines a reward for the student if the performance analyzer indicates that the student has reached a milestone. The reward can depend on the student's preference. The reward generator, coupled to the reward determinator, generates the reward for the student.

34 Claims, 13 Drawing Sheets

325

Generate Test Results
by the Score Generator — 327

↓

Analyze Test Results Using
Analysis Rules by — 329
Test Recommendation Generator

↓

Generate Recommendations — 330

↓

Generate Test by
Question Generator — 331

Figure 6

REWARD ENRICHED LEARNING SYSTEM AND METHOD II

CROSS-REFERENCE TO RELATED APPLICATIONS

This is a continuation-in-part of U.S. patent application Ser. No. 08/633,582, filed on Apr. 17, 1996, now U.S. Pat. No. 5,743,746 and incorporated by reference into this application.

BACKGROUND OF THE INVENTION

The present invention relates generally to education and more particularly to using rewards to enrich the learning process in a computer-aided-educational system.

For centuries, learning has been treated as a reward in itself The reward is as much in the effort as in the result. That is why when an innocent lad asked an ancient philosopher what was the use of his teaching, the ancient philosopher gave that lad a penny and asked him to leave. However, in the present days, typically learning is considered as an investment. A students decision to attend a University is at least partially influenced by the prospect of getting a better job with the University degree. Similarly, a University is ranked higher if most of her graduates have successful careers.

The shift in focus in education increases the emphasis on rewards in the education. Rewards come in different forms. One type of rewards revolves around education itself This includes getting recognition through receiving a better grade, accepting a coupon to buy books, getting a scholarship to pay for tuition and receiving an internship in the industry. Another form of rewards is not related to education. This includes parents paying five dollars if their child gets an A, and a father quitting the habit of smoking if his daughter graduates from high school. Typically, these non-educational-related rewards are closely monitored and provided by either the student's close relatives, guardians or teachers. As long as the above rewards are appropriately applied, all of them can enrich the learning process. They can make learning more fun and interesting for the student. Moreover, rewards can encourage the student to work harder and to perform better. Finally, rewards can indirectly increase the student's competitiveness because students can compare with other students what they have achieved or what rewards they have received.

The proliferation of computer has led to a number of computer-aided approaches to education. Rewards in a computer environment have another added advantage. As compared to an instructor taking days to grade a student's homework, a computer-aided-educational system can reward the student in a more immediate manner. This will enhance the learning experience. While the problem and the student's approach to resolve the problem are still very fresh in the students mind, a computer can provide the solution and a reward to the student. This should help the student to better retain what he has learnt.

Prior art computer-aided-educational systems typically do not incorporate rewards to enrich the learning process. There are a number of exceptions. Unfortunately, those exceptions have a number of shortcomings. For example, they do not allow an instructor, such as the student's parents, guardian or teacher, to set when and what to reward the student. Allowing the instructor to set when and what to reward a student is very important. First, the instructor is more aware of the strengths, weaknesses and preferences of the student, and should be able to set more appropriate goals and rewards for the student. Second, if the instructor can set when and what to award the student, the instructor is directly in control of the student's learning progress.

Those exceptions also do not allow the student to postpone receiving rewards. The concept of postponed gratification is very important in any educational system. If education is treated as an investment, which can be defined as putting money or effort in certain areas for future rewards, computer-aided-educational system should reinforce the concept of postponed gratification.

Finally, those exceptions do not provide a report on the history of the students learning process. Without such a report, it is very difficult for the instructor to monitor the student's progress. To find out about the student's progress, the instructor can watch the student as the student is working on the assignment, and then recall the student's past performance to identify his progress. However, this defeats one of the purposes of using a computer to teach a student because if the instructor is constantly watching, why not let the instructor teach the student instead. Moreover, the student may be working on many areas. It would become a complex task to clearly identify the history of the student's progress in different areas, especially when one instructor may not be knowledgeable enough to cover many areas. Another way to identify the student's progress is to ask the student. But this is not the best approach because it is difficult for the student to correctly and objectively report on his own progress.

It should be apparent from the foregoing that there is still a need for a computer-aided-educational system and method to enrich a student's learning process through rewards. The system should be able to allow instructors to set when and what to reward the student. The system should also be able to allow the student to postpone receiving a reward, and to allow the instructors to more easily monitor the student's progress.

SUMMARY OF TEE INVENTION

The present invention provides a computer-aided-educational system and method to enrich a student's learning process through individualizing rewards. The invention allows an instructor or a user to set when and what to reward. The invention also allows a student or the user to delay receiving the reward. Moreover, the invention generates a report on the history of the student's performance so as to help the instructor to monitor the student's progress.

In one embodiment, the invented system teaches the student a subject. The subject is divided into line-items, with at least one line-item being more difficult than another line-item. The instructor, such as the student's teacher, guardian or parent, enters his password into the invented system. If the password matches the instructor's password stored in the system, the instructor has gained access into the system, and can set each line-item where there should be a milestone. The system also provides a list of pre-selected rewards so that the instructor can pick the reward at each milestone. The list or a part of the list can depend on the student's preference. The system then generates a milestone/reward table, capturing the instructor's inputs.

A performance analyzer accesses the table. In one embodiment, the analyzer is a test system, which generates tests for the student to take. Based on the test results, the analyzer determines if the student has reached any one of the milestones set by the instructor. In another embodiment, the analyzer generates and presents sets of instructions to the student. Based on the instructions presented, the analyzer determines if the student has reached any one of the milestones. Such information is then transmitted to a reward determinator.

The reward determinator based on the information in the reward table determines the type of reward for the student if the student has reached a milestone. In one embodiment, there are two types of rewards. The first type is a point system, and the second type is an actual reward. The student can accumulate points or get an actual reward. It would be up to the student to decide. If the student's preference is to pick an actual reward, the student can postpone receiving the reward if the student so desires. If the students preference is to pick the point system, his points will be accumulated as he gets more points through reaching more milestones.

A report generator accesses the student's preference and the milestone reached by the student from the reward determinator. The generator stores the milestone-reached in a report storage medium, and also accesses from the storage medium the history of the milestones reached by the student. In one embodiment, based on the accessed information, a report is generated every time the student reaches a milestone. In another embodiment, the instructor can query the report generator to find out about the student's performance. Based on the report, if the student picks points as rewards, then based on the accumulated points, the instructor sets rewards accordingly.

If the student does not want to postpone getting the reward, a reward generator generates the reward for the student. Depending on the type of reward in one embodiment, the reward generator accesses the reward from a reward storage medium; and in another embodiment, the reward generator accesses the reward from a network.

After the student has claimed the reward, the system asks for the student's feedback as to his interest in the reward. This information is also sent to the report generator to be presented in the report so that the instructor knows whether she should adjust the rewards for future milestones.

If the student has postponed receiving his reward and later decides to re-claim it, he can enter his password into the system. If the password matches the student's password stored in the system, the student can re-claim his postponed rewards.

Note that in one of the embodiments described above, the invention provides rewards when the student has demonstrated understanding in the subject through tests, not when the system has presented the instructional material. That embodiment requires feedback from the student, with the rewards reflecting on the student's understanding.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

FIG. 6 shows a set of steps for one embodiment of the test system in the present invention.

Same numerals in FIGS. 1–11 are assigned to similar elements in all the figures embodiments of the invention are discussed below with reference to FIGS. 1–11. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
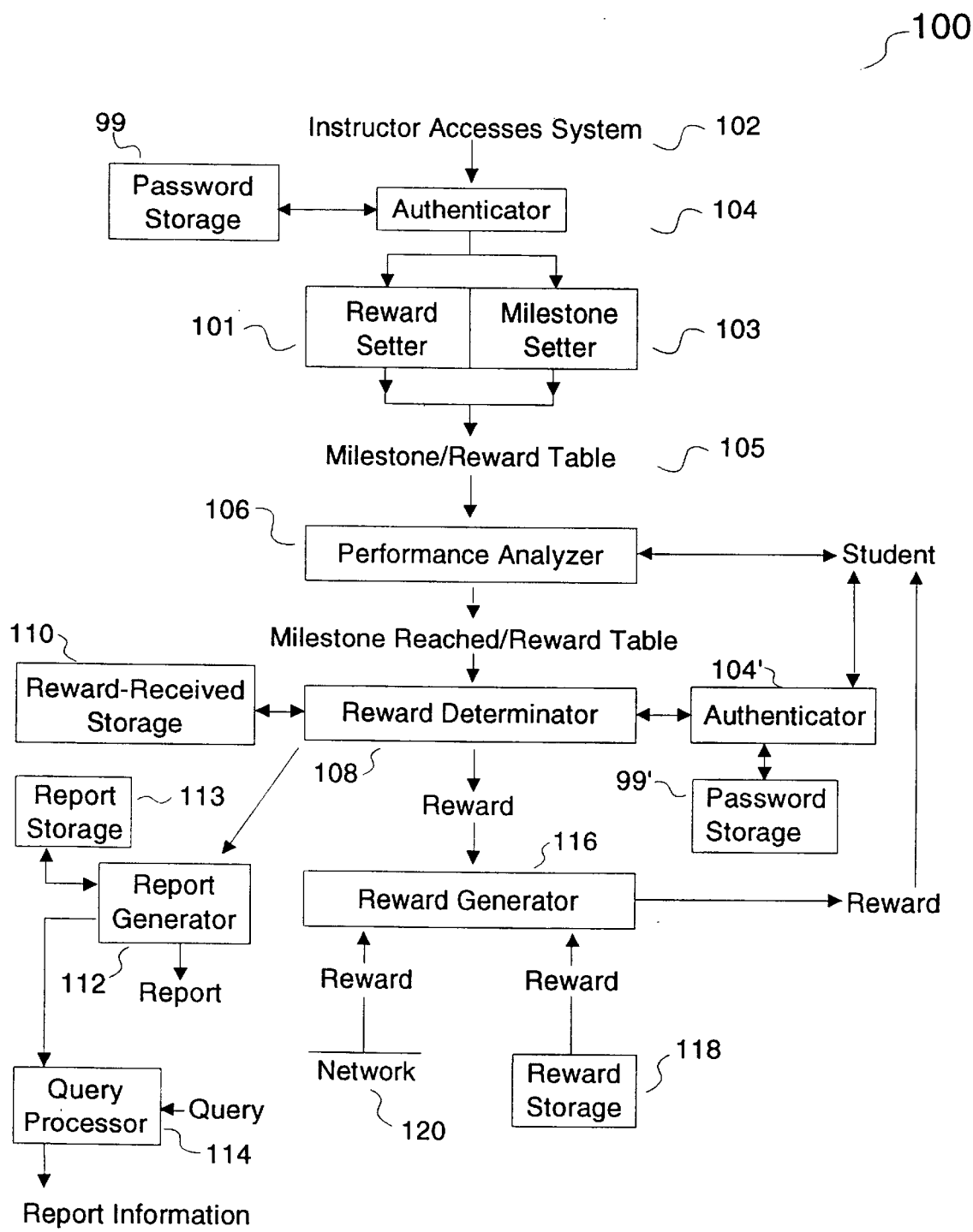
FIG. 1 shows one embodiment of the computer-aided-educational system in the present invention.

The invention is for teaching one or more subjects to a student or a user. FIG. 1 shows one embodiment of the computer-aided-educational system 100 in the present invention. The system includes a number of components, such as a milestone setter 103 coupled to a performance analyzer 106. The performance analyzer 106 is coupled to a reward determinator 108, which is coupled to a reward generator 116 and a report generator 112. The different components within the system do not have to reside in one computer. They can be located in more than one computing device, with the computing devices exchanging information through a computer network or a storage medium or other means. In one embodiment, the system also includes a number of storage media, such as a reward-received-storage medium 110 and a reward-storage medium 118. In another embodiment, one or more or all of the different storage media, such as floppy disks, are detached from the system.

Figure 2A:
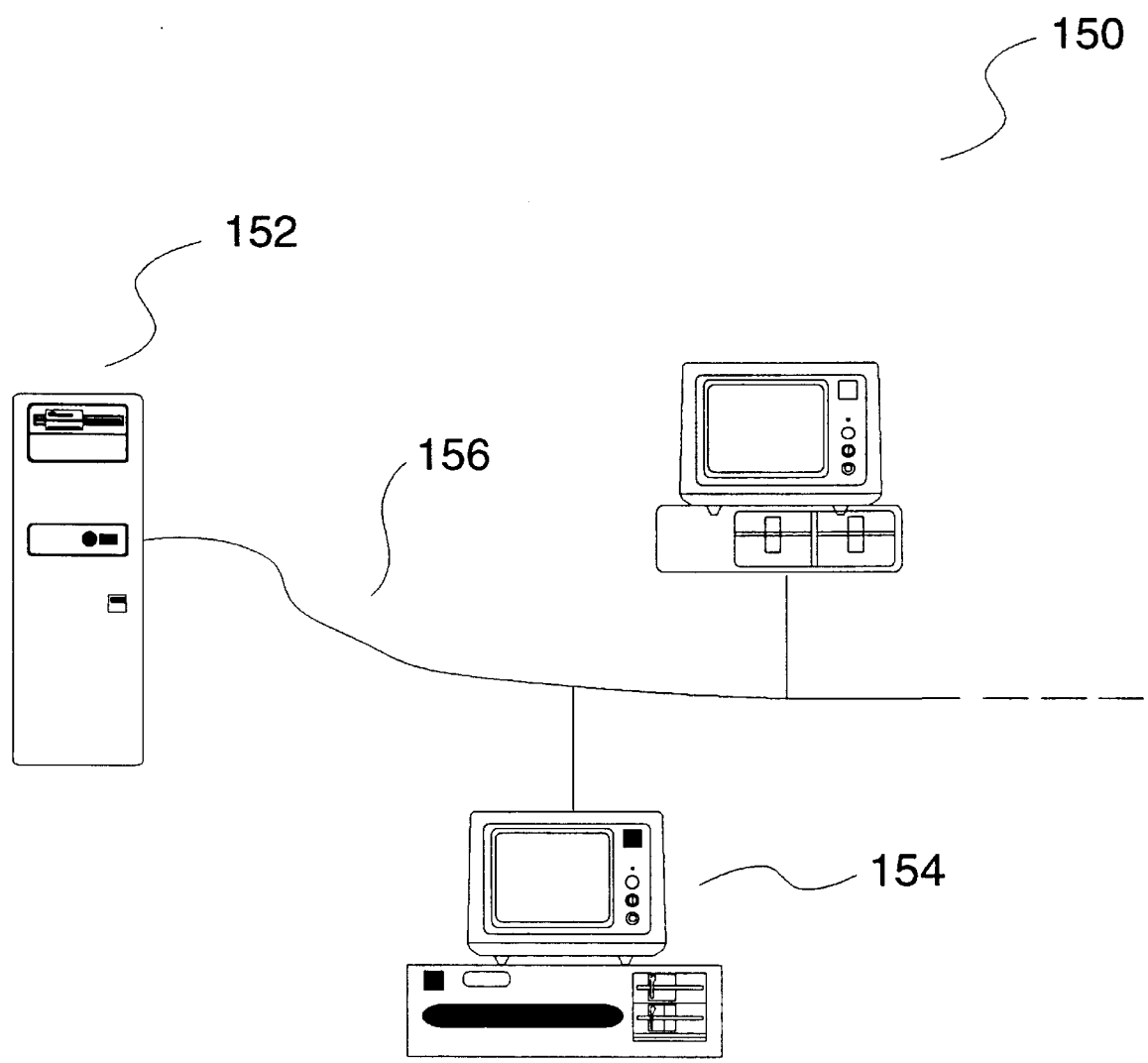
FIGS. 2A–B show one embodiment of a system implementing the present system
Figure 2B:
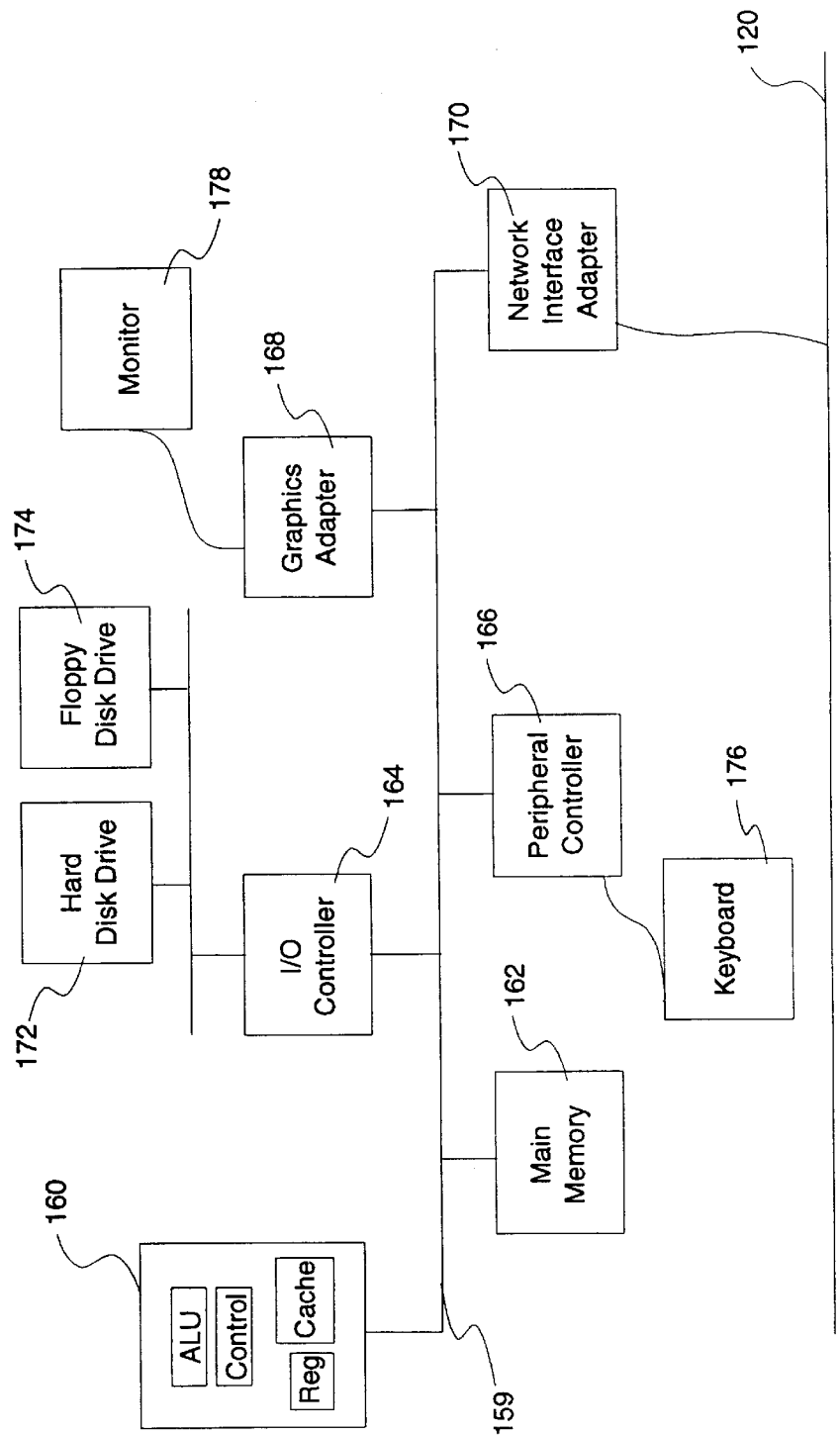

FIG. 2A shows one embodiment of an apparatus 150 implementing the present system, preferably in software and hardware. For example, the performance analyzer 106 can be in a server computer 152, while the milestone setter 103 and the reward generator 116 can be in a client computer 154. In such an embodiment, the different computers can communicate with each other through a dedicated communication link, or through a computer network 156. FIG. 2B shows one embodiment of the client computer 154; it typically includes a bus 159 connecting a number of components, such as a processing unit 160, a main memory 162, an I/O controller 164, a peripheral controller 166, a graphics adapter 168 and a network interface adapter 170. The I/O controller 164 is connected to components, such as a harddisk drive 172 and a floppy disk drive 174. The peripheral controller 166 is connected to components, such as a keyboard 176. The graphics adapter 168 is connected to a monitor 178; and the network interface adapter 170 is connected to the network 120. The network includes the internet, the intranet, the world wide web and other forms of networks.

In one embodiment, a subject is divided into major-topics, with each major-topic subdivided into minor-topics, and with each minor-topic further subdivided into line-items. In another embodiment, the subject is further divided into more levels below the line- items; and in a third embodiment, the subject is just divided into line-items. The line-items are not of equal difficulties. At least one line-item is more difficult than another line-item.

Figure 3:
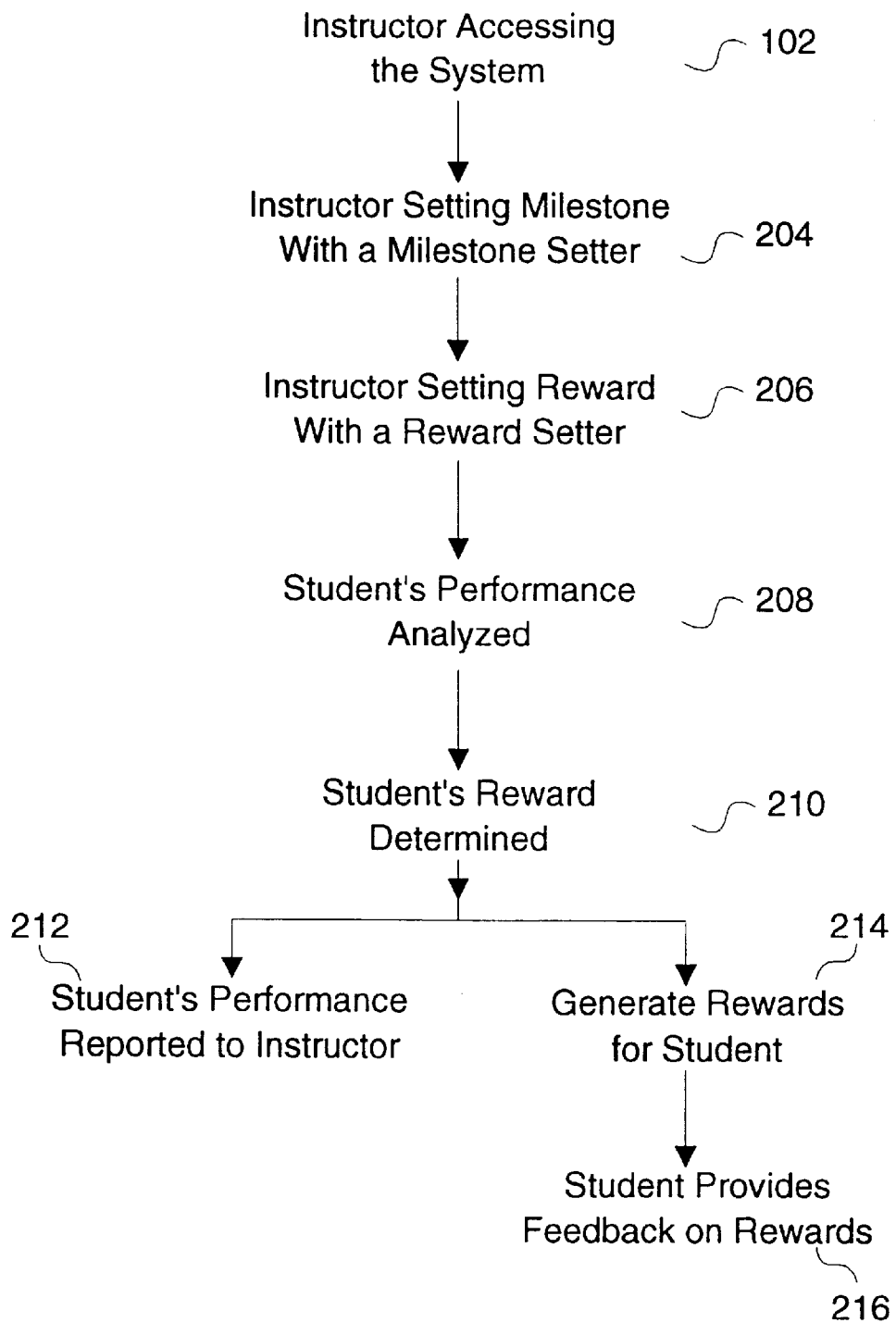
FIG. 3 shows a set of steps to implement one embodiment of the present invention.

FIG. 3 shows a set of steps 200 to implement one embodiment of the present invention. In one embodiment, an instructor or a user, who can be the student's father, guardian or teacher, accesses 102 the system. If this is the very first time the system 100 is being accessed, one embodiment includes a pre-storing process. During this process, the system asks for a list of instructors' individual passwords. Those passwords are received by an authenticator 104, which stores them in a password storage medium 99. From that point onwards, only those instructors whose passwords match any one stored in the system would be able to go through the authenticator 104.

Figure 4:
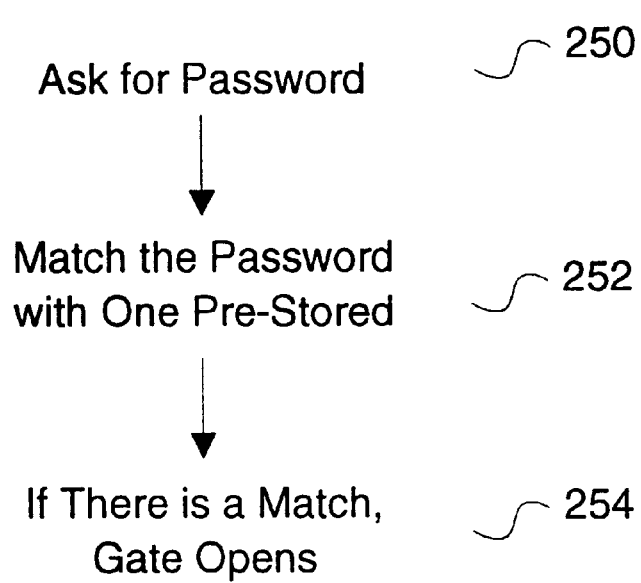
FIG. 4 shows a set of steps for an instructor to access one embodiment of the system in the present invention.

FIG. 4 shows a set of steps for an instructor to access one embodiment of the system in the present invention. First, the authenticator 104 asks 250 for the instructor's password. Based on its pre-stored data in the password storage medium 99, the authenticator 104 tries to match (252) the password with one pre-stored in the medium 99. If there is a match (254), the authenticator 104 allows the instructor to access the system.

Milestone Setter

After going through the authenticator 104, the instructor can set 204 milestones with the milestone setter 103, and rewards with a reward setter 101, for the student. As an example, if the major-topic of the subject mathematics is high school algebra, except for explanations inside brackets, the milestone setter 103 provides the instructor with the following list on the monitor 178:

High School Algebra (the major-topic)
(Minor-topics under the major-topic)
Decimal Numbers
Polynomials
Linear Equations
Quadratic Equations
   Integers
(Line items under the minor-topic of integers)
Addition & Subtraction
Multiplication
Division
Prime Numbers
Factorization
Common Divisor
   Fractions
(Line items under the minor-topic of fractions)
Addition and Subtraction (+/−) with Common Denominator
+/− with Integers
+/− w/o Common Denominator
Multiplication and Divisions (*,/) with Integers
*,/ with fraction
Compound Fractions
Fraction Reduction
Ratios and Proportions This list in the above example is generated based on expert knowledge on general relationship among different areas in the subject of mathematics, and more particularly in the major-topic of high school algebra. The way to generate the relationships should be well known to experts in the subject—the more knowledgeable the expert, the more complete the set of line-items.

In one embodiment, one or more line-items where there should be milestones are heuristically determined by statistics, based on the strengths and weaknesses or understanding of similar students in the subject. Such information can be found through academic research. Through the student's profile, one or more milestones can be set. Typically, the instructor knows the strengths and weaknesses of the student, or his group of students. He can then set one or more milestones at line-items that reflect the student's or his group of students' understanding in the subject.

In one embodiment, the milestone setter 103 is implemented with a dialog box in a Windows environment. The dialog box contains a list of line-items, with each line-item having a check box; and another list of names of previously-set milestone, with each milestone name having a check box. The dialog box also contains a set of buttons, with one for adding a milestone, another for deleting a milestone, and one for exiting the dialog box. When the instructor wants to add a milestone, the instructor clicks the adding button. Then the instructor can set a name for that milestone. That name will be added to the milestone name list, with its corresponding check box created. After setting the name, the instructor clicks the check box of one or more line-item corresponding to that milestone. This will set a milestone. When the instructor wants to delete a milestone, the instructor clicks the check box of that milestone and then clicks the delete button. Modifying a milestone can be done by clicking the check box of the name of that milestone, and then clicking the one or more corresponding line-items.

The user-interface and programming required to implement the milestone setter 103 should be obvious to those skilled in the art, and will not be further described in the present application.

Reward Setter

After a milestone has been set, the instructor can set 206 a reward for that milestone with the reward setter. In one embodiment, after the instructor checks a box to set a milestone for a line-item, the reward setter provides the instructor with a list of rewards on the monitor 178. Except for explanations inside brackets, the following shows an example of such a list:

Book Certificate from a major bookstore
(The student can buy a book she likes, or subscribe a magazine of her choice.)
Gift Certificate from a major toy store
(A gift serves to recognize a job well-done. Just as a scholarship, the gift helps to reinforce the students belief that he has been recognized for what he has accomplished, which would build his confidence.)
Points
1 . . . 10
(As the student learns, the student can accumulate points. The number of points can reflect his performance. When the total value reaches a threshold value, the student can redeem it with a gift or a book. In another embodiment, it would be up to the instructor to reward the student based on the points he has received.)
A graphic animation with music
Pick one piece of music from a list of choices
(Playing a piece of the student's preferred music could make the learning process more enjoyable.)
An interactive play
(Allowing the student to put aside studying for a short time and to participate in an interactive virtual exploration or experiment or game increases the joy of learning. The level of complexity of the exploration or game can be decided by the amount of the reward or the line-item covered in the learning material. If the play is an exploration, it can be related to the subject matter, which not only can provide the relaxing entertainment, but also expose the more advanced concept of the subject. This should further increase the students interest level in the subject.)
An invitation
(The student can be given two special tickets to invite a friend to visit a museum. In another embodiment, the student can be invited to access the network. For example, an award would be to allow her to check the latest technology, to play a developing game, or to chat with other students with similar achievement.)

In one embodiment, the list or a part of the list can be heuristically determined by statistics based on the preferences of similar students. For example, students within a certain age group living in Sunnyvale, California, prefer certain types of toys or games. Such information can be found through market research. So, based on the student's profile, the above list of rewards, or some of the rewards in the list, can be generated through heuristics. Whether the list, or a part of the list, is based on the student's preference, the instructor can select individual reward at one or more of the milestones based on her understanding of the student's preference, or the preferences of the group of students she is teaching. Thus, one or more rewards received by the student not only depend on his performance in the materials presented to be learnt, but also depends, at least to a certain degree, on the student's preference, or on what the student prefers. With a reward related to the student's preference, different students achieving the same performance can receive different rewards.

In one embodiment, the reward setter 101 is implemented with a dialog box in a Windows environment. The dialog box contains a list of rewards, and a list of previously-set milestones, with each milestone having a check box and each reward also having a check box. The instructor can set a reward at a milestone by first clicking the milestone's check box, and then clicking the corresponding reward's check box, such as using a mouse or a keyboard. If the instructor wants to add or delete a reward from a milestone, the instructor clicks the check box of the milestone that has been set, and then clicks on the appropriate reward check boxes. The dialog box also includes an exit button for exiting the dialog box.

The user-interface and programming required to implement the reward setter 101 should be obvious to those skilled in the art, and will not be further described in the present application.

In another embodiment, if the instructor does not want to select any milestones or rewards, the system 100 would, by default, set a milestone with a reward at every line-item. In another embodiment, the system 100 sets a milestone with a reward at some of the line-items, which can include the last line-item of the subject before the student has mastered the subject. With only some line-items being set as milestones, some additional suspense and uncertainty are created in the learning process. In one embodiment, one or more of the line-items where milestones are set can change each time the system 100 is turned on, or is used. This unpredictability increases suspense, and may enhance satisfaction. A random number generator can be used to produce such randomness.

After the selection of milestones and rewards, the system 100 generates a milestone/reward table 105. The table includes the names of one or more students. The table sets the rewards and milestones for those specified students. In another embodiment, the instructor does not have to enter the names of the students. The table applies to any student within a class of student that would have access to the system 100. Presumably, that table suits the strengths and backgrounds of that class of students. The table is then accessed by the performance analyzer 106 to analyze 208 the student's performance.

Test System

In one embodiment, the performance analyzer includes a test system that is based on the student's performance in taking tests. In this embodiment, rewards reflect on the student's understanding.

The student takes a test on the subject. For one embodiment, each question in the test belongs to a line-item, and has a complexity level, which may range from 1 to 9. Consider the line item of addition and subtraction of fractions with common denominator. The degree of complexity of such a question depends, for example, on the number of fractions or terms in the mathematical expression, and the number of digits of the numerator. For example, $½+⅗$ is less complex than $½+⅗+7/2$ since the latter has more terms; and $1/76+7/76$ is less complex than $43/76+59/76$ since the latter has more digits than the former.

In one embodiment, the test taken by the student involves one or more line-items, with questions covering a range of complexity levels, as in a conventional test. In another embodiment, the questions in the test belong to the same line-item and are of the same complexity level.

Figure 5:
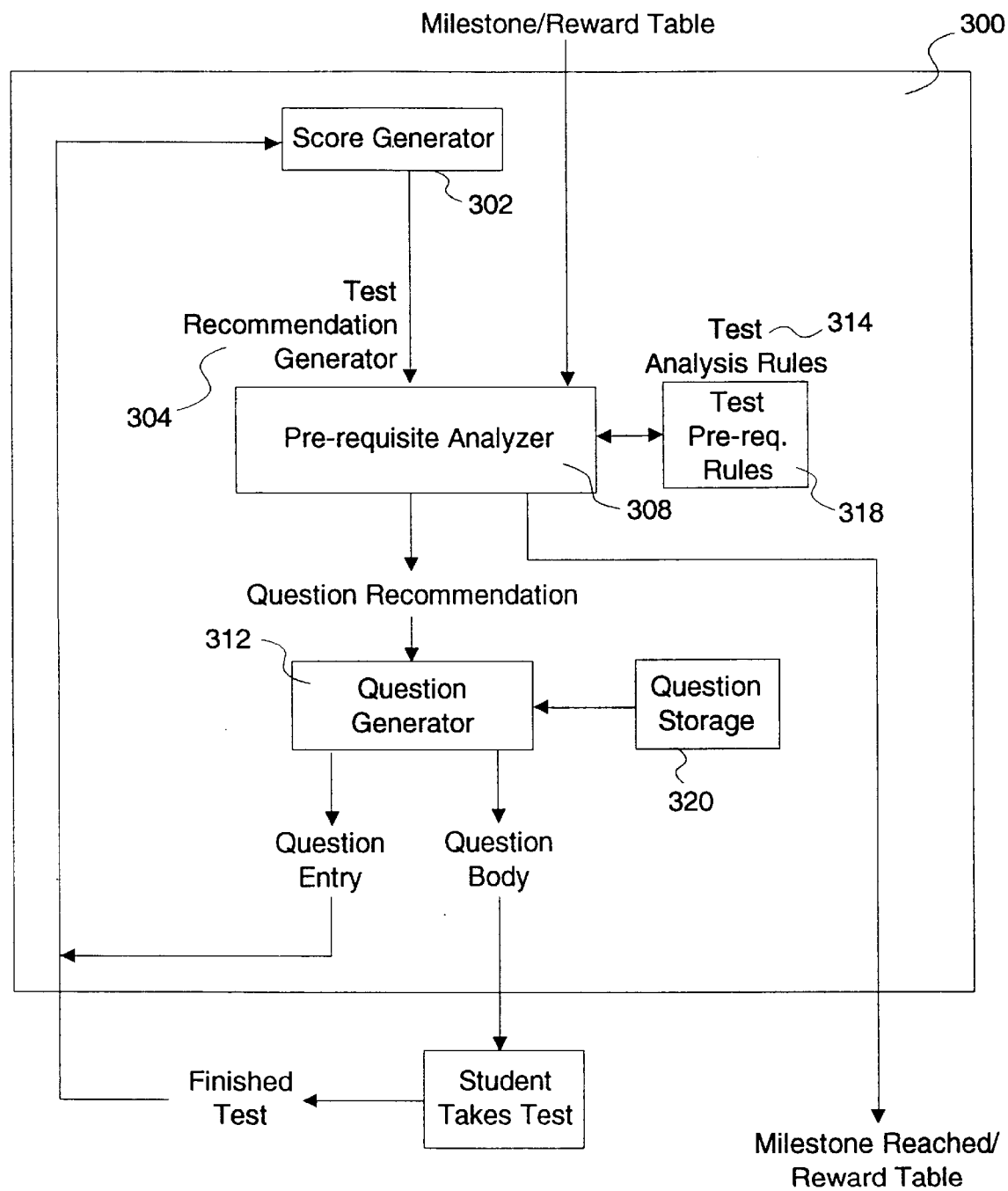
FIG. 5 shows one embodiment of a test system included in the performance analyzer of the present invention.

FIG. 5 shows one embodiment of the test system 300 included in the performance analyzer of the present invention, and FIG. 6 shows a set 325 of steps for one embodiment of the test system 300 in the present invention. After the student has taken a test, the finished test with the question entry, which includes the answers to the questions, are accessed by a score generator 302. The score generator 302 grades the finished test to generate 327 test results.

A test recommendation generator 304 accesses the milestone/reward table, the test results from the score generator 302, and a set of test-pre-requisite rules 318 from a test-analysis-rules-storage medium 314. With the accessed information, the test results are analyzed 329 to generate 330 recommendations for the student. In one embodiment, recommendations include the milestones reached, with the grade achieved at the milestone, if any; and the next set of questions to test the student. The milestone reached with the grade achieved at the milestone, if any, can be combined into a milestone reached/reward table.

In another embodiment, the pre-requisite rules are in the form of a complexity-hierarchy, with each rule including a line-item and the pre-requisites required to reach that line-item; for example,

| Line-item | Pre-requisite |
|---|---|
| Frt +/− w/o comm denom | Frt +/− w/comm denom (7,B), & Frt +/− w/ Int (8,C). |

The line item reads (fractional addition and subtraction without common denominator). Its pre-requisite reads (fractional addition and subtraction with common denominator) and (fractional addition and subtraction with integer). The bracketed numeral and alphabet denote the difficulty level and the minimal grade or mastery required before a student can advance to the line-item.

The pre-requisite rules are generated based on expert knowledge on general relationship among different areas in a subject. The way to generate the rules to form the relationships should be well known to experts in the subject--the more knowledgeable the expert, the more complete the set of rules.

The complexity-hierarchy describes the relationship of the line-items because the pre-requisites themselves are line-items, each with its pre-requisites. The complexity hierarchy is formed by relating the line-items.

In one embodiment, the complexity hierarchy follows the sequence of the list provided to the instructor as the instructor is setting the milestone. The list determines the sequence of the line-items to test the student because the minor topics or major topics can all be broken down into line-items. In another embodiment, the instructor can change the order of the line-items on that list to alter the sequence of the line-items to test the student. For these two embodiments, each line-item only has one pre-requisite.

Moving up the hierarchy can imply taking a test or working on a line-item that is harder. In one embodiment, to move up the complexity-hierarchy, such as to move to a certain complexity level in a line-item, the student has to satisfy all of the pre-requisites of that complexity level in the line-item. Note that the hierarchy is a representation for the pre-requisite rules, and is not a necessity for the rules to be applied to the test results.

There are a number of ways to apply the complexity-hierarchy to the contents in the test results. One way is to compare the grade and the level of each line-item in the test results with the corresponding grade and level of that line-item (the bracketed values) in the complexity-hierarchy. If the student has reached a grade higher than that required, and if there is a milestone at that line-item, the student would have reached the milestone. If the student has not reached the grade or the level required, the next test for the student would be on the same level or the next level of the line-item accordingly.

Another way to apply the complexity-hierarchy is based on formulae. For example, a prolog program with a set of Horn's clauses describes the complexity-hierarchy. Each pre-requisite rule is represented by a Horn's clause. A recommendation, such as whether the student has reached a milestone, is determined by resolving the Horn's clauses.

The recommendation is accessed by a question generator 312. In one embodiment, the recommendation in addition to indicating if the student has reached one or more milestones, also includes a number of recommendation entries in the following format:
(subject, major-topic, minor-topic, line-item, complexity).
For each recommendation entry, in one embodiment, the question generator 312 generates 331 a number of questions at that line-item and complexity level as questions for the next test.

There are a number of ways to generate questions for each recommendation entry. In one embodiment, the question generator 312 accesses a set of question entries from a question-storage medium 320, each of which is of the following format:
(subject, major-topic, minor-topic, line-item, complexity, qbody, answer),
where qbody is the body of the question describing the following serves as an example:
Subject: Mathematics.
Major-topic: High School Algebra.
Minor-topic: Fraction.
Line-item: Fraction +/− with common denominator or (Frt +/− w/ comm denom)

| Complexity | Answer | Qbody |
|---|---|---|
| 3 | 28/37 | What is the sum of 2/37, 3/37, 8/37 and 15/37? |
| 3 | 2/43 | 17/43 − 25/43 + 6/43 = ? |

The question generator selects question entries according to the recommendation entries. For example, each recommendation entry suggests questions to be at a certain complexity, or suggests the student to work on a line item at a complexity level ("Cm"). The question generator, following the recommendation, generates N1 question entries of the specified complexity, N2 question entries of the next higher complexity level if Cm is not the highest complexity level, and N3 question entries of the previous lower complexity level if Cm is not the lowest complexity level. For example, N1 is a random number ranging from 2 to 5, with N2 and N3 also being random numbers chosen between 0 and N1.

After the student has taken a test consisting of the question bodies of the questions entries generated, grading can be done by the score generator using conventional means such as with a scanner to scan in the student's finished test. The score generator 342 receives the question entries from the question generator 312 to access the answers to the questions. Based on the question entries, the score generator 342 grades the finished test and generates the test results. In one embodiment, the test results are in a table format, with one entry for one difficulty level of a line-item, such as the following:
(subject, major-topic, minor-topic, line-item, complexity, test score).

If the student has not interacted with the system before, then in one embodiment, the test system 300 first asks the student to enter his identification and his age. This can be done, for example, through the keyboard 176. Based on the students age, the question generator 312 generates the first set of questions for the student. The line-item and complexity level of this set of questions follows the skill level of average students at the students age group. The same method can be applied to generate a set of questions for a student whose identity and age are in the system, but who has not taken any tests in a specific subject administered by the system.

As described above, after the student takes a test, the test recommendation generator, using the pre-requisite rules, determines if the student understands a certain line-item or not. As an example, one criterion for understanding a line-item is achieving a grade "B" or better at a complexity level of eight or higher. If the student satisfies such a criterion, the student will be considered as understanding the line-item. If there is a milestone set at that line-item, the student would have reached that milestone.

Milestones do not have to be limited to be set at line-items. Milestones may be set in a number of different ways. For example, there can be a milestone reached if (1) the student has attained certain score in the test results, (2) the student has attained certain mastery level in a line item, (3) the student has attained certain mastery level in the subject, (4) the student has attained certain mastery level in a selected list of line-items or subjects, (5) the student has fulfilled the pre-requisites of a selected list of pre-requisite rules, and (6) the student has consistently achieved at least a certain grade in the last three tests. Although each milestone in the above examples may not be set at a line-item, the milestone is directly or indirectly related to a line-item. For example, achieving certain mastery level in the subject can be defined as achieving at least grade B, level 8 of the last line-item required for the subject.

Note that for the sixth alternative where there is a milestone reached after the student has consistently achieved at least a certain grade in the last three tests, a storage medium in the test system temporarily stores the student's test results. Only when there are a number of consecutive test results achieving at least a certain grade would the student be considered as reaching a milestone.

Presentation System

Figure 7:
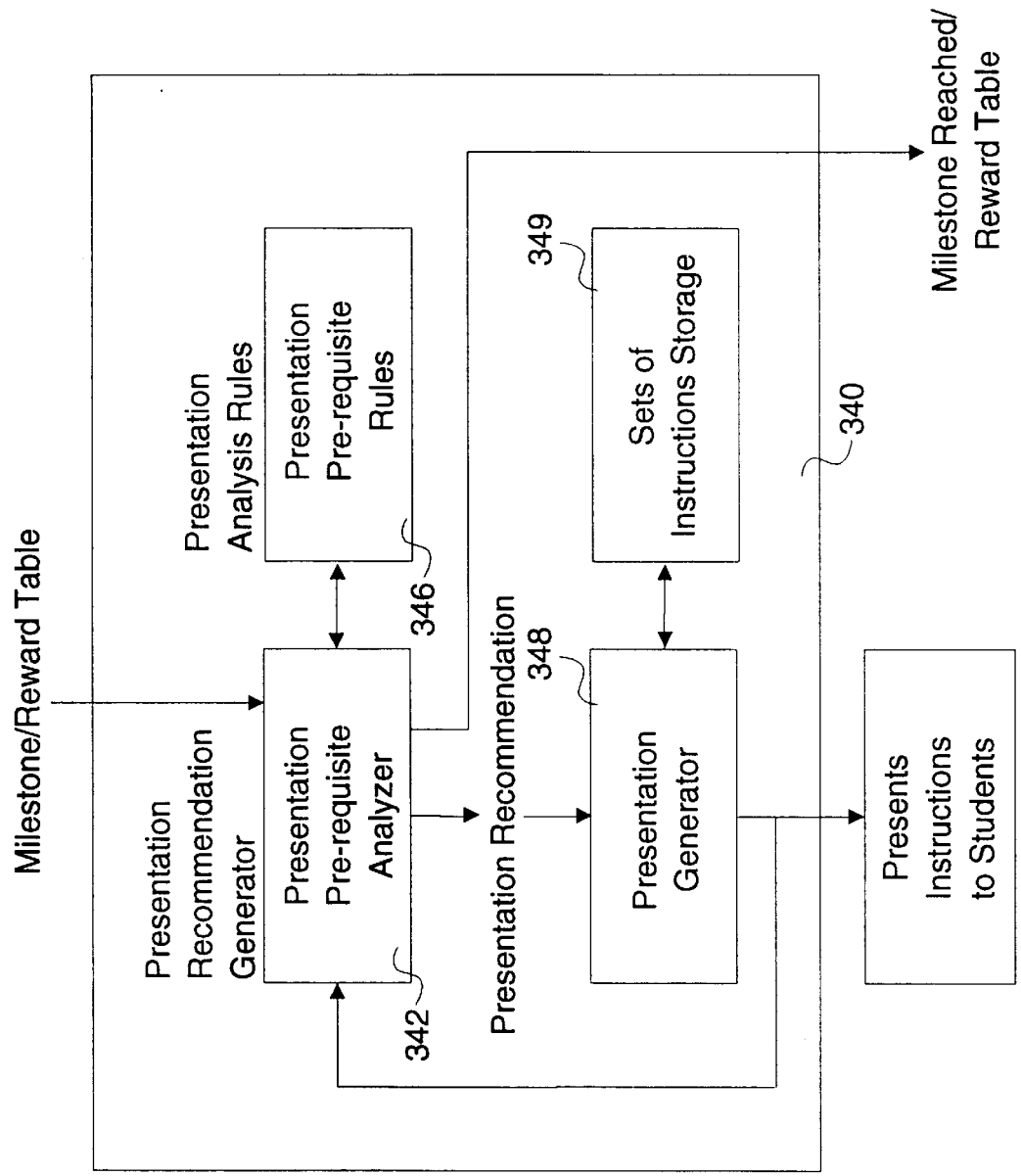
FIG. 7 shows one embodiment of a presentation system included in the performance analyzer of the present invention.
Figure 8:
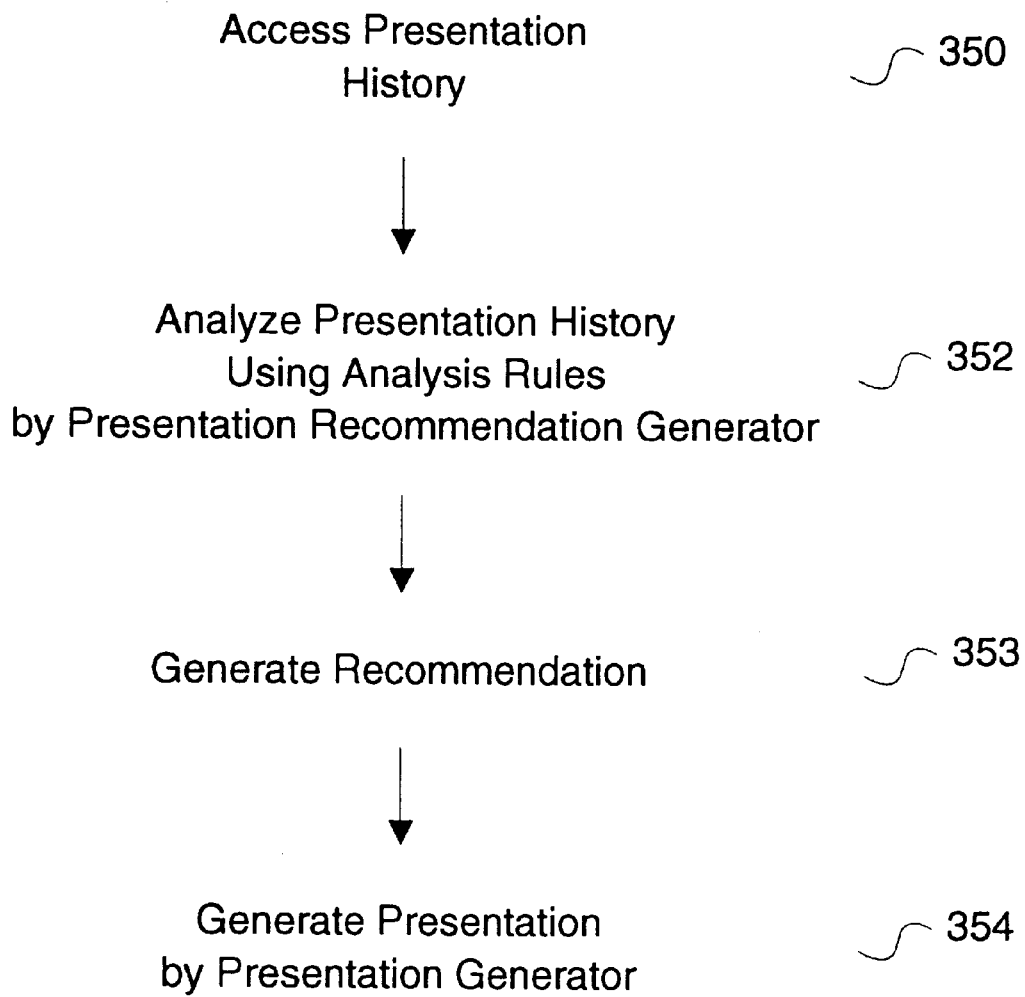
FIG. 8 shows a set of steps for one embodiment of the presentation system in the present invention.

FIG. 7 shows one embodiment of a presentation system 340 included in the performance analyzer 106 of the present invention, and FIG. 8 shows a set of steps for one embodiment 340 of the presentation system. In this embodiment, the student does not take any tests. Instead, the analyzer includes a presentation system 340, which presents instructions to the student. The focus of this system is to convey information on the subject to the student, not on assessing the student's understanding in the subject. The student is not tested. Thus, a reward does not indicate how well the student understands the subject. Rewards in such an environment are still very usefull because at least they keep the student's interests and focus in the subject matter. Moreover, exercising the reward from time to time can reduce the stress built-up during a long lecture or presentation.

In one embodiment, there are a number of sets of instructions related to each line-item, with each set related to each level of that line-item. For example, one set can be for the complexity level of 4, and the other set for the complexity level of 9.

A presentation recommendation generator 342 accesses 350 the instructions presented to the student. In one embodiment, the presentation recommendation generator 342, including a presentation pre-requisite analyzer, accesses the milestone/reward table, and accesses a set of pre-requisite rules from a presentation-analysis-rule-storage medium 346 to analyze 352 the presentation history. Based on the analysis, the recommendation generator generates 353 recommendations for the student. In one embodiment, recommendations include the milestones he has reached, if any; and a presentation recommendation for the student. The milestone reached, if any, can be included in a milestone reached/reward table. The presentation recommendation includes recommendations for the next set of instructions to be presented. The implementation here is similar to that disclosed in the test system. However, there will not be any grades involved. For example, one set of pre-requisite rules are as follows:

| Line-item | Pre-requisite |
|---|---|
| Frt +/− w/o comm denom | Frt +/− w/comm denom (7), & Frt +/− w/ Int (8). |

In the above example, if the student has been presented the set of instructions related to level 7 of fractional +/− with common denominator, and the set of instructions related to level 8 of fractional +/− with integer, the recommendation generator generates a recommendation, which in addition to indicating if the student has reached one or more milestone, includes a recommendation entry in the following format: (subject, major-topic, minor-topic, line-item, complexity), with the line-item being fractional +/− without common denominator at the complexity of 1.

In one embodiment, the set of instructions to be presented follows the sequence of the list provided to the instructor as the instructor is setting the milestone. The list determines the sequence of the line-items to be presented to the student. For example, after one line-item has been presented to the student, the recommendation entry is the next line-item in the sequence.

The recommendation entry is accessed by a presentation generator 348, which based on each entry, generates a set of instructions at that line-item and complexity level for the next set of instructions to be presented to the student.

For the present example, to determine if the student has reached one or more milestone, the recommendation generator 342 compares the line-item of fractional +/− with common denominator with the line-items in the milestone/reward table. Assume that there is a milestone for that line-item; the student would have reached that milestone if the presentation system has presented the instruction set related to level 7 of that line-item to the student because level 7 is the level set in the pre-requisite rule.

Based on the recommendation provided by the recommendation generator 342, such as the next set of instructions is the set related to level 1 of fractional +/− without common denominator, the presentation generator 348 accesses that set of instructions from a sets-of-instructions-storage medium 349 to be presented 354 to the student. The presentation can be done through a monitor of a personal computer, through a television set or even through a radio. The student should have to go through each line of the instructions. The presentation can also be a set of instructions printed from a fax machine to be read by the student.

In one embodiment, the presentation recommendation generator 342 accesses the instructions presented to the students, and the cycle repeats. In another embodiment, the recommendation generator just accesses the different recommendation entries to decide on the instructions presented to the student. Also, there can be more than one milestone for each line-item. In other words, one milestone can be at one level of the line-item, and another milestone at another level.

In one embodiment, the system 100 includes a fast-forward mechanism, which can increase the speed of presentation of the instructions to the student. This mechanism can be the page-down button on a keyboard. It would not be beneficial to the student if he activates this mode to speed through the instruction. Thus, one embodiment includes a speed-controller, which can de-activate the fast-forward mechanism so that the speed of presentation cannot be increased. The implementation for such an approach should be obvious to those skilled in the art.

If the student has not interacted with the presentation system 340 before, the student can enter his name and some of his characteristics, such as his age, into the system 340. Based on such information, the presentation generator 348 generates a set of instructions for the student. In one embodiment, the complexity level and line-item of this set of instruction follow the skill level of average students at the student's age group. The same method can be applied to generate a set of instructions for a student whose identity and age are in the system, but who has not received any instructions in a specific subject administered by the system.

In another embodiment, the performance analyzer includes both a test system and a presentation system similar to those described above. As in above, the test system analyzes the student's test results to decide if the student has reached a milestone. Also, based on the results, a set of instructions are selected to present to the students so as to prepare the student for the next test. After the presentation, the test system generates the next set of tests for the student, and the cycle repeats.

As described above, the performance analyzer analyzes the performance of the student to decide if the student has reached any milestone. Based on, for example, a test taken, or a set of instructions presented to the student, the performance analyzer sends information on the student's performance such as the milestone reached by the student, to the reward determinator 108. In one embodiment, the milestone reached/reward table is generated for the reward determinator 108.

Reward Determinator

Figure 9A:
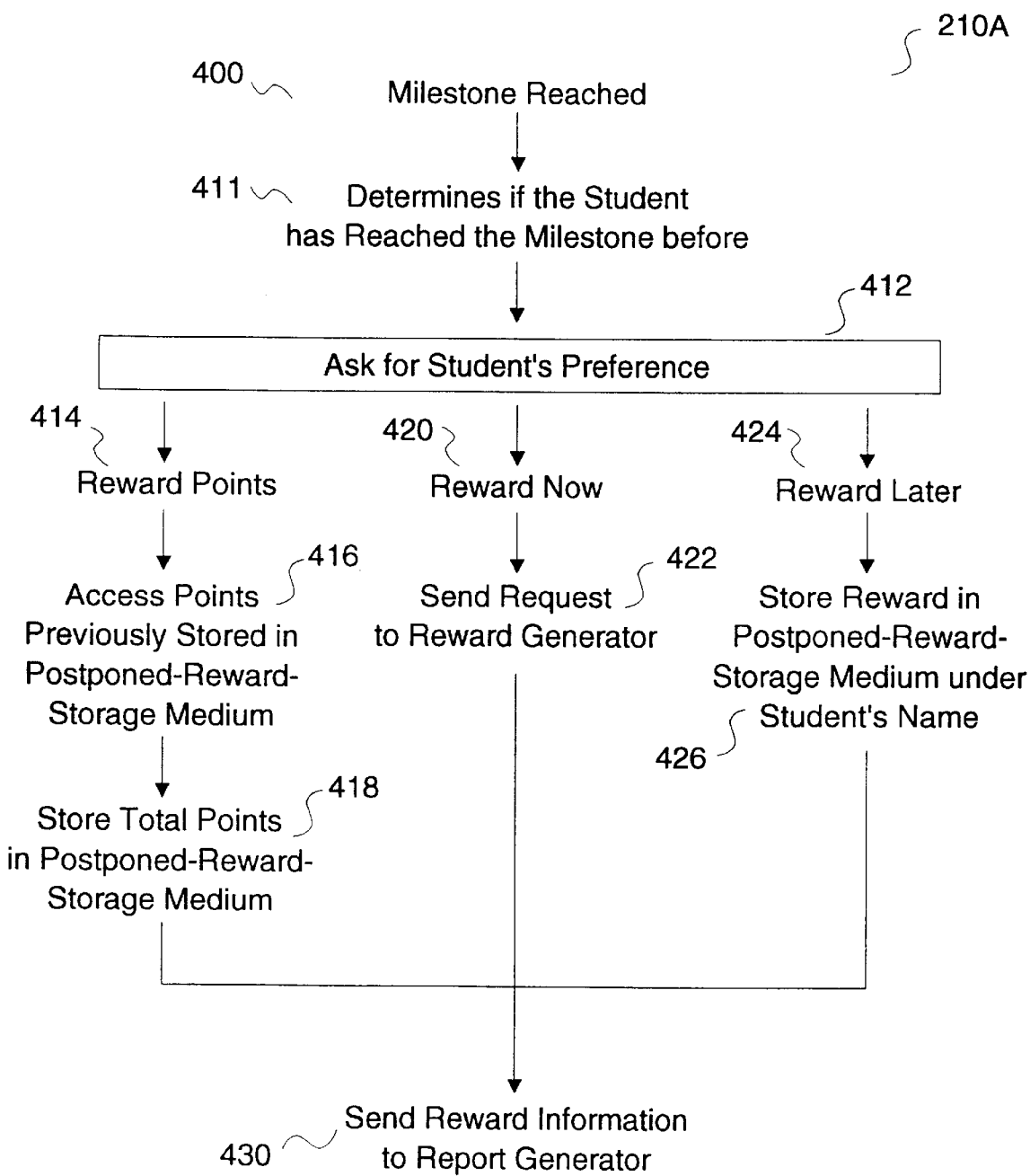
FIGS. 9A–B show a set of steps to determine rewards for the student in one embodiment of the present invention.
Figure 9B:
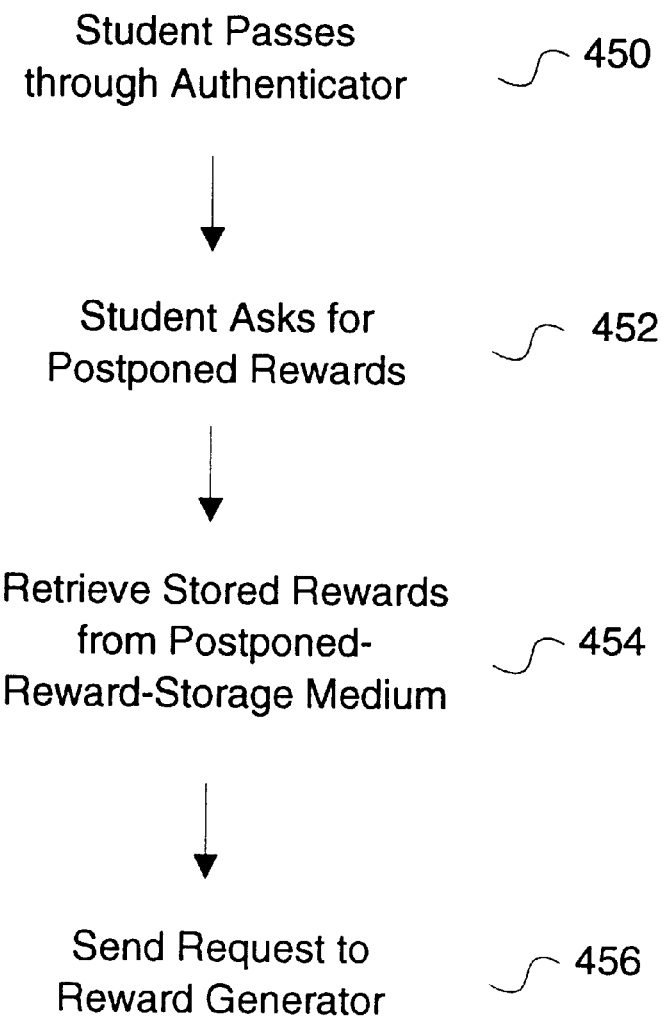

FIGS. 9A–B show steps to determine 210 rewards by one embodiment of the reward determinator 108 for the student.

FIG. 9A illustrates the sequence of events when the student has reached 400 a milestone. First, the reward determinator 108 congratulates the student, and determines 411 if the student has reached this milestone before. In one embodiment, this is done through accessing the student's information in a reward-received-storage medium 110. Every time after the student has reached a milestone, such information is stored in the medium 110. In one embodiment, if the performance analyzer is a test system, the grade achieved by the student is also stored. The determinator 108 compares the student's name and the milestone just reached with any milestones previously reached by the same student. In one embodiment, if there is a match, the determinator 108 sends a message to the student, indicating that he will not get a reward because he has received such a reward before. In another embodiment, reaching a milestone with a higher grade in a test gets more points as compared to reaching the milestone with a lower grade. For this embodiment, if there is a match and if the performance analyzer is a test system, the determinator 108 will compare the grades achieved—if the student gets a higher grade the second time, the student will get a number of points that is equal to the difference between the points he gets the second time and the points he got the first time.

If the student has not reached such a milestone before, the determinator 108 asks for 412 the student's preference. The student's preference here can be different from the student's preference in the reward setter. In one embodiment, the student has three preferences here.

The student can ask for points 414 as a reward. As described above, each milestone can have a number of points associated with it. The student can ask 414 for such points. The reward determinator 108 also accesses 416 points previously received by the student that are stored in the reward-received-storage medium 110. Those points, if any, are added to the points just awarded to the student. Then the reward determinator stores 418 the students total number of points in the reward-received-storage medium 110 under the student's name. Note that points are for rewarding purposes; they do not affect the set of questions or instructions for the student.

For the second preference, the student can ask for the reward 420. The reward determinator 108 will send 422 such a request to the reward generator 116.

Lastly, the student can request to postpone 424 receiving the reward. The reward determinator 108 stores the reward 426 in the reward-received-storage medium 110 under the student's name. If the student has not postponed rewards before, the system would ask the student to enter a password. That password is stored in the password-storage medium 99'.

The student's preference is then sent 430 to the report generator 112. If the student asks for points, the report generator 112 also receives the total number of accumulated points belonging to the student.

If the student asks for the reward now, after the student's access and enjoyment, the student is given an option to comment on the reward. Such comments are also sent as reward information to the report generator 112.

FIG. 9B illustrates the sequence of events for the student to redeem her postponed rewards. First, the student has to pass 450 through an authenticator 104'. This authenticator is similar to the authenticator 104 for the instructor, except this authenticator 104' tries to match the student's entered password with one pre-stored in the password storage medium 99'.

After the student passes through the authenticator 450, the student can ask for 452 the postponed rewards. The reward determinator 108 retrieves 454 the stored rewards from the reward-received-storage medium 110, and sends the reward request 456 to the reward generator 116.

Report Generator

Figure 10:
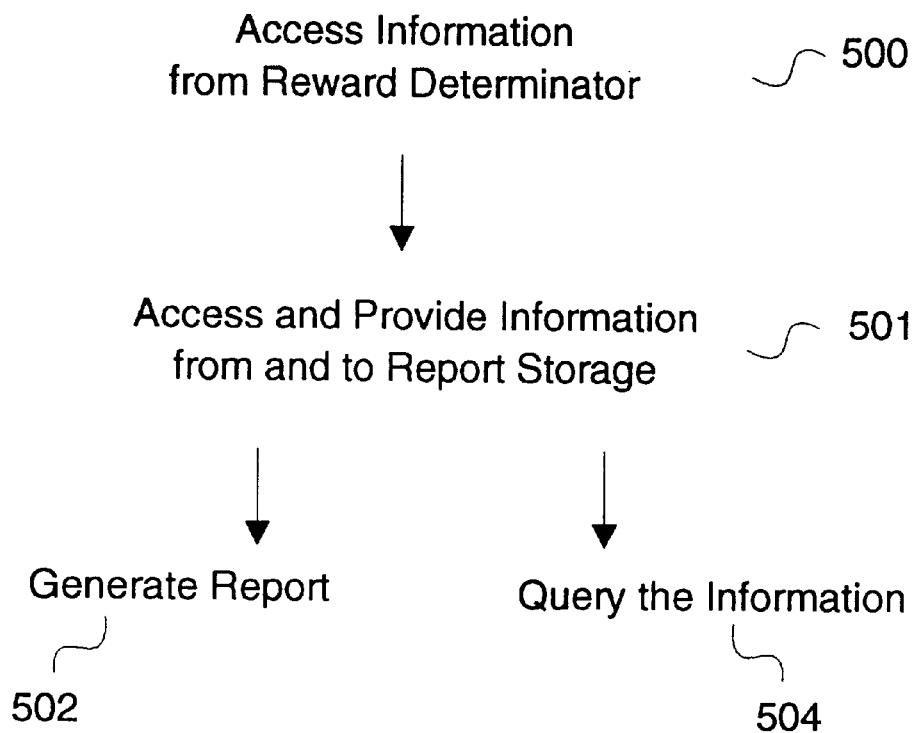
FIG. 10 shows a set of steps to present the student's performance to an instructor in one embodiment of the present invention.

FIG. 10 shows a set of steps by the report generator 112 to report 212 the student's performance to the instructor in one embodiment of the present invention. First, the report generator 112 accesses 500 the student's milestone and reward information from the reward determinator 108. The information, for example, includes the student's name, any milestone reached, the student's preference in terms of reward and the student's comment on the reward, if any. Then, the report generator 112 stores the student's milestone and reward information in a report-storage medium 113. Also, the report generator 112 accesses the history of the student's milestones-reached, if any, from the report storage medium 113. Based on the accessed information, the report generator generates 502 a report for the instructor. The student's comment on the reward helps the instructor to adjust rewards for future milestones, if necessary.

The report may include a history of the student's performance. In one embodiment, the report tabulates by line-items a history of the student's performance, including the time and the date the report is generated. In one embodiment, the performance reported includes the history of all the milestones reached by the student, including the date when each was reached, the levels of the line-items and the grades, if any. The date for each milestone is determined by the performance analyzer, which includes a clock for dating each milestone reached.

In one embodiment, a report can be generated every time the student has achieved a milestone. In another embodiment, a report is generated after the student has done a test or after an instruction set has been presented. The report can be on a printed medium, a telephone message, or transmitted through other audio-visual medium. In another embodiment, the instructor can select the format of the report and the medium to send the report. In yet another embodiment, the instructor can query 504 the report generator through a query processor 114. In one embodiment, the instructor has to go through an authenticator, similar to the authenticator 104, before the instructor can query the report generator 112. Based on a query program, which should be obvious to those skilled in the art, the instructor can query the query processor 114 to obtain information in the report.

Reward Generator

Figure 11:
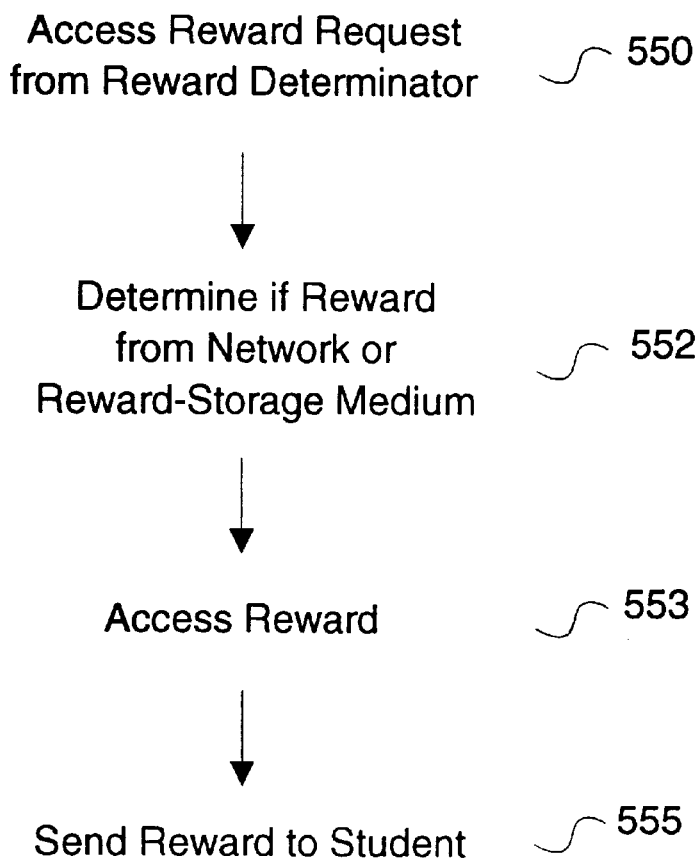
FIG. 11 shows one set of steps to generate rewards by one embodiment of the reward generator in the present invention.

FIG. 11 shows one set of steps to generate 214 rewards for the student by one embodiment of the reward generator 116 in the present invention. First, the reward generator 116 accesses 550 the reward request from the reward determinator 108. The reward generator 116 then determines 552 the source of the reward. If the reward is a book certificate or a gift certificate, such types of rewards will be printed for the student. If the reward is a graphic animation with music, the reward generator 116 accesses 553 such types of rewards from the reward-storage medium 118. If the reward is to play a developing game or to chat with other students with similar achievement, the reward generator can access 553 such types of rewards from the network 120 through the network interface adapter 170. Then the reward generator 116 sends 555 the reward to the student, or allows the student to access the reward.

After the student's access and enjoyment, the student is given an option to comment on the reward. If the student does not have to leave the system 100 to enjoy the reward, such as the reward is a song played by the system, then immediately after the student's enjoyment of the reward, the student can bypass the authenticator 104' to provide his comments on the reward to the reward determinator 108. If the student has to leave the system 100 to enjoy the reward, such as the reward is a trip to a museum, then after the student's enjoyment of the reward, in order for the student to provide his comments on the reward, the student has to enter his password to go through the authenticator 104'. Such comments to the reward determinator 108 are also sent as reward information to the report generator 112.

Note that accessing in the present invention can be as simple as just acknowledging the receipt of data from a transmitting source.

The system 100 can be in different computers. For example, the authenticators 104 and 104', the password storage medium 99 and 99', the reward setter 101, the milestone setter 103, the reward determinator 108, the reward-received-storage medium 110, the reward generator 116, the report generator 112, the report storage 113, the query processor 114 and the reward storage medium 118 can be in a client computer, and the performance analyzer 106 can be in a server computer. Other arrangements are also applicable. Also, in one embodiment, the system 100 only includes some of the components. For example, the system 100 includes the performance analyzer 106 and the reward determinator 108, but does not include the milestone setter 103, so the milestones have been pre-set.

In one embodiment, two line-items may cover the same area but different levels of complexity in a subject. For example, one line-item covers complexity levels 1 to 4 of addition/subtraction; and another line-item covers complexity levels 5–8 of addition/subtraction. In another embodiment, a line-item has only one complexity level.

The subject in the present invention is very broadly defined. Different subjects that have relationship can be combined into one subject in the present invention. For example, physics, chemistry and biology can be combined into the subject called science; or car-fixing can be a subject in the present invention.

Also, note that a student can achieve more than one milestone in each test or presentation. Such information as determined by the performance analyzer is accessed by the reward determination. The student will have to decide on her reward preference for each reward.

In one embodiment, one or more of the components in the system are implemented through software. In another embodiment, the present invention is implemented through an object oriented program, with each component as an object. For example, the reward determinator is an object, and the reward generator is another object. In yet another embodiment, one or more of the components, such as the reward determinator, can be implemented on a circuit, such as a field-programmable-gate-array, where the entire program embodying one or more of the components is burnt into the circuit.

The present invention uses tables in a number of situations to transfer data. Other forms may be used. For example, data may be transferred as a list of information.

The specification uses the terms student and instructor. In one embodiment, both can be replaced by the term user, as the person using the system.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A computer-aided-learning apparatus for rewarding a student who has attained a milestone in a subject, which is divided into line-items with at least one line-item being more difficult than another line-item, the apparatus comprising:

a performance analyzer for determining whether the student has reached a milestone; and a reward determinator coupled to the performance analyzer for determining a reward for the student that has reached a milestone, with at least one reward being based on the student's individual preference specifically tailored to the interest of the student.

2. A computer-aided-learning apparatus as recited in claim 1 further comprising a milestone setter for setting a plurality of milestones, with each milestone being related to a line-item, and with the milestone setter coupled to the performance analyzer to allow the performance analyzer to access the milestones.

3. A computer-aided-learning apparatus as recited in claim 2 wherein input is provided to the milestone setter to set each line-item that has a milestone to be reached.

4. A computer-aided-learning apparatus as recited in claim 2 wherein there is a milestone to be reached for every line-item in a selected group of line-items.

5. A computer-aided-learning apparatus as recited in claim 4 wherein input is provided to the milestone setter to select the line-items in the group.

6. A computer-aided-learning apparatus as recited in claim 1 further comprising a reward setter that is coupled to the performance analyzer for setting a reward for each milestone, with the information on the rewards being accessed by the performance analyzer.

7. A computer-aided-learning apparatus as recited in claim 1 further comprising:

a report generator coupled to the reward determinator for accessing and reporting the milestone reached by the student; and a report-storage medium coupled to the report generator for keeping a record of the one or more milestones reached by the student.

8. A computer-aided-learning apparatus as recited in claim 7 further comprising a query processor coupled to the report generator for querying the report to find out if the student has reached a milestone.

9. A computer-aided-learning apparatus as recited in claim 1 further comprising a reward storage medium to store the reward or the identification of the reward determined, which can allow the student to postpone receiving the reward.

10. A computer-aided-learning apparatus as recited in claim 1 further comprising a reward storage medium for storing the one or more milestones reached by the student, which can prevent the student from getting a reward twice through reaching the same milestone a second time.

11. A computer-aided-learning apparatus as recited in claim 1 wherein:

the reward is one or more points; and a reward is provided to the student based on the number of points.

12. A computer-aided-learning apparatus as recited in claim 1 further comprising a reward-storage medium, which stores the reward determined.

13. A computer-aided-learning apparatus as recited in claim 1 further comprising a network interface adapter so that the reward can be accessed from a network through the network interface adapter.

14. A computer-aided-learning apparatus as recited in claim 1 further comprising a test system for providing one or more tests for the student, so that the test results indicate whether the student has reached a milestone.

15. A computer-aided-learning apparatus as recited in claim 1 wherein there is a milestone to be reached for every line-item.

16. A computer-aided-learning apparatus for rewarding a student who has attained a milestone in a subject, which is divided into line-items with at least one line-item being more difficult than another line-item, the apparatus comprising:

a milestone setter for setting a plurality of milestones, with each milestone being related to a line-item, and with at least one such line-item related to the student's understanding in the subject;

a performance analyzer for determining whether the student has reached a milestone; and a reward determinator for determining a reward for the student if the performance analyzer indicates that the student has reached a milestone set by the milestone setter.

17. A computer-aided-learning apparatus as recited in claim 16 comprising a reward setter that is coupled to the performance analyzer for setting a reward for each milestone, with the information on the rewards being accessed by the performance analyzer, and with at least one reward being based on the student's individual preference specifically tailored to the interest of the student.

18. A computer-aided-learning method of rewarding a student for attaining a milestone in a subject, which is divided into line-items with at least one line-item being more difficult than another line-item, the method comprising the steps of:

determining by a performance analyzer whether the student has reached a milestone; and determining by a reward determinator a reward for the student that has reached a milestone, with at least one reward for a milestone being based on the student's individual preference specifically tailored to the interest of the student.

19. A computer-aided-learning method as recited in claim 18 further comprising the steps of setting by a milestone setter a plurality of milestones, with each milestone being related to a line-item.

20. A method as recited in claim 19 further comprising the step of setting a reward for each milestone.

21. A computer-aided-learning method as recited in claim 18 further comprising the step of accessing the reward from a network.

22. A computer-aided-learning method of rewarding a student who has attained a milestone in a subject which is divided into line-items with at least one line-item being more difficult than another line-item, the method comprising the steps of:

setting by a milestone setter a plurality of milestones, with each milestone being related to a line-item, and with at least one such line-item related to the student's understanding in the subject;

determining by a performance analyzer whether the student has reached a milestone; and determining by a reward determinator a reward for the student that has reached one of the milestones.

23. A computer-aided-learning method as recited in claim 22 further comprising the step of setting a reward for each milestone by a reward setter, with at least one reward being based on the student's individual preference specifically tailored to the interest of the student.

24. A computer-aided-learning method as recited in claim 22 further comprising the step of accessing the reward from a network.

25. A computer-aided-learning apparatus for rewarding a user who has attained a milestone in a subject, which is divided into line-items with at least one line-item being more difficult than another line-item, the apparatus comprising:

a performance analyzer configured to determine whether the user has reached a milestone, so as to identify a reward for the user who has reached a milestone, with at least one reward for a milestone being based on the user's individual preference specifically tailored to the interest of the user.

26. A computer-aided-learning apparatus as recited in claim 25 wherein:

the performance analyzer is in a first computer;

the user is allowed access to the reward through a second computer; and the first computer is coupled to the second computer through a network.

27. A computer-aided-learning method of rewarding a user for attaining a milestone in a subject, which is divided into line-items with at least one line-item being more difficult than another line-item, the method comprising the step of:

determining by a performance analyzer whether the user has reached a milestone, so as to identify a reward for the user who has reached a milestone, with at least one reward for a milestone being based on the user's individual preference specifically tailored to the interest of the user.

28. A computer-aided-learning method as recited in claim 27 wherein:

the performance analyzer is in a first computer;

the user is allowed access to the reward through a second computer; and the first computer is coupled to the second computer through a network.

29. A computer-aided-learning apparatus for rewarding a user who has attained a milestone in a subject, which is divided into line-items with at least one line-item being more difficult than another line-item, the apparatus comprising:

a reward generator configured to allow the user access to a reward when the user has reached a milestone; wherein:

whether the user has reached a milestone is determined by a performance analyzer, so as to identify a reward for the user who has reached a milestone; and at least one reward for a milestone is based on the user's individual preference specifically tailored to the interest of the user.

30. A computer-aided-learning apparatus as recited in claim 29 wherein the reward generator is in a first computer, which is coupled through a network to the performance analyzer in a second computer.

31. A computer-aided-learning apparatus as recited in claim 30 wherein the reward generator is coupled to a milestone setter, which is configured to set a plurality of milestones.

32. A computer-aided-learning method of rewarding a user for attaining a milestone in a subject, which is divided into line-items with at least one line-item being more difficult than another line-item, the method comprising the step of:

allowing the user access to a reward when the user has reached a milestone; wherein:

whether the user has reached a milestone is determined by a performance analyzer, so as to identify a reward for the user who has reached a milestone; and at least one reward for a milestone is based on the user's individual preference specifically tailored to the interest of the user.

33. A computer-aided-learning method as recited in claim 32 wherein the user is allowed access to the reward in a first computer, which is coupled through a network to the performance analyzer in a second computer.

34. A computer-aided-learning method as recited in claim 33 further comprising the step of setting a plurality of milestones.

* * * * *